United States Patent
Deprun et al.

(10) Patent No.: US 7,641,123 B2
(45) Date of Patent: Jan. 5, 2010

(54) METHOD AND APPARATUS FOR CONTACTLESS INTERFACE ON ICC SUPPORTING HIGH SPEED INTERFACE

(75) Inventors: Jean-François Deprun, Paris (FR); Paul Jolivet, Juvisy sur Orge (FR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 11/555,622

(22) Filed: Nov. 1, 2006

(65) Prior Publication Data

US 2007/0200003 A1 Aug. 30, 2007

Related U.S. Application Data

(60) Provisional application No. 60/776,752, filed on Feb. 24, 2006.

(51) Int. Cl.
*G06K 19/06* (2006.01)
*G06K 7/06* (2006.01)
(52) U.S. Cl. ........................... 235/492; 235/441
(58) Field of Classification Search .............. 235/492, 235/440, 380, 441, 451, 487; 340/932.2; 710/14, 301
See application file for complete search history.

(56) References Cited

U.S. PATENT DOCUMENTS

| 6,199,128 | B1* | 3/2001 | Sarat ........................... 710/301 |
| 6,801,956 | B2* | 10/2004 | Feuser et al. .................. 710/14 |
| 6,883,715 | B1* | 4/2005 | Fruhauf et al. ............. 235/492 |
| 7,296,754 | B2* | 11/2007 | Nishizawa et al. .......... 235/492 |
| 2004/0178278 | A1* | 9/2004 | Fruhauf et al. ............. 235/492 |
| 2004/0232248 | A1* | 11/2004 | Cho ........................... 235/492 |
| 2005/0045720 | A1* | 3/2005 | Fruhauf ...................... 235/440 |
| 2005/0212690 | A1* | 9/2005 | Nishikawa .............. 340/932.2 |
| 2006/0186211 | A1* | 8/2006 | Kim et al. ................... 235/492 |

* cited by examiner

*Primary Examiner*—Steven S Paik
*Assistant Examiner*—Sonji Johnson
(74) *Attorney, Agent, or Firm*—Lee, Hong, Deggerman, Kang & Waimey (57) ABSTRACT

An integrated circuit card includes a plurality of electrical contacts; and a memory to store information, the memory being allowed to communicate with a processor via the plurality of electrical contacts. One set of electrical contacts are allowed to be allocated by the processor to support an operation in at least one mode depending on a presence of a certain protocol mode detected by the processor. The integrated circuit card is operable in various modes including both contactless and high speed protocols, a contactless only without the high speed protocol and the high speed protocol only without the contactless protocol.

21 Claims, 4 Drawing Sheets

Figure 1: UICC contact allocation

METHOD AND APPARATUS FOR CONTACTLESS INTERFACE ON ICC SUPPORTING HIGH SPEED INTERFACE

CROSS REFERENCE TO RELATED APPLICATION

Pursuant to 35 U.S.C. §119, this application claims the benefit of earlier filing date and right of priority to U.S. Provisional Application No. 60/776,752, filed Feb. 24, 2006, the contents of which are hereby incorporated by reference herein in its entirety.

BACKGROUND OF THE INVENTION

1. Field of the Invention

The present invention relates to a smart card (SC) or an integrated circuit (IC) card which may be based on a standard such as Universal Integrated Circuit Card (UICC) or the like or has compatibility with those standards; and more particularly relates to a mobile communications terminal that may accommodate the IC card.

2. Description of Related Art

An integrated circuit (IC) card has an embedded integrated circuit (IC) that may be a logic circuit and be typically coupled to physical interfaces, which allow the IC card to communicate with external devices to perform various functions. The external devices may include a mobile communications terminal, a personal computer, an IC card adapter-writer/reader, and so on.

Most IC cards or UICC are likely to support, in addition to a historical International Standard Organization (ISO) protocol (e.g., ISO 7816), a high speed protocol that can be based on MultiMediaCard (MMC) or Universal Serial Bus (USB). When the UICC or IC card is engaged with the SC writer/reader or the terminal, which may have an IC card adapter, connected to a computer via a high speed protocol interface such as the USB standard, the IC card may provide a user with a low-cost, high-speed serial interface that can be easy to use and support a "plug and play" function to the devices external to the computer. In addition, a single mode IC card may separately support a contactless protocol. In addition, a dual mode IC card may possibly switch from the historical ISO 7816 protocol to the high speed protocol or vice versa.

The integrated circuit (IC) card typically includes eight electrical contacts. However, not all eight electrical contacts are electrically engaged with an embedded processor and some of them are unused. These unused contacts can either be allocated to a specific technology. It can be a significant drawback that if only unused electrical contacts of the IC card can be allocated for the high speed protocol, this allocation of the contacts may be in conflict with the need for contactless protocol because the contactless protocol should be enabled on at least one unused electrical contact as well.

In addition, the issue is that the number of electrical contacts available on the UICC or IC card is typically limited to eight. As the functions and capabilities of wireless communications devices continue to develop, increasing the total number of electrical contacts may be one way to support such developments. However, adding new physical electrical contacts on the UICC can require the significant modifications for both UICC and any external device that needs to communicate with it.

SUMMARY OF THE INVENTION

One aspect of the present invention pertains to the recognition by the present inventors about the background art problems explained above. Namely, it would be advantageous to maintain the total number of electrical contacts (e.g., eight contacts) of the IC card, but dynamically allocate such limited number of contacts in an appropriate manner in order to accommodate and properly support multiple functions and interfaces, especially to handle high speed data communications and contactless protocol.

This invention provides a solution for concurrently implementing high speed and contactless protocols to provide enhanced services and applications, whereby the UICC (including applications such as Subscriber Identity Module (SIM), Universal SIM (USIM), IP based MultiMedia Subsystem SIM (ISIM or IMS SIM)) requires new interfaces to be used.

The historical ISO 7816 protocol provides communication channels limited due to the protocol used (T=0 and T=1) that is not designed for high speed communication. Enhanced solutions provide a new interface and protocol for high speed protocol and for specific services (e.g. contactless protocol).

It is a further object of the invention to provide a solution to reallocate the electrical contacts that are not used during a session in such way to allow the UICC to perform a communication channel (either in the ISO 7816 or high speed protocol), the contactless protocol or any combination thereof. One application to which this invention can be implemented would be a commercial service environment that simultaneously supports the both high speed protocol and contactless protocol.

Therefore, an object of the present invention is to solve issues of multiple protocol implementations with the limitation of available contacts in an IC card (e.g., UICC, SIM card, USIM card, smart card, etc.).

The present invention shows that the IC card is located in a mobile communications terminal to implement procedures that are compatible with at least one of the group comprising a Subscriber Identity Module (SIM) function, a Universal Subscriber Identity Module (USIM) function, and ISIM function.

It is another object of the present invention to ease the implementation on the terminal side, as for instance it prevents from using the high speed protocol for contactless service It is another object of the present invention to take into account the cases of UICC supporting only contactless (and not high speed) protocol or high speed (and not contactless) protocol.

The present invention allows UICC to enable to concurrently operate in a high speed protocol and contactless protocol without multiplexing signals nor reusing ISO or high speed protocols for contactless protocol.

To achieve these and other advantages and in accordance with the purpose of the present invention, as embodied and broadly described herein, there is provided an integrated circuit (IC) card comprising a plurality of electrical contacts and a memory to store information, the memory being allowed to communicate with a processor via the plurality of electrical contacts, wherein at least one set of electrical contacts are allowed to be allocated by the processor to support an operation in at least one mode depending on a presence of a certain protocol mode detected by the processor To achieve these and other advantages and in accordance with the purpose of the present invention, a method for, dynamically allocating at least one set of a plurality of electrical contacts of an IC card, the method comprising receiving information from the IC card at an open session; initiating a negotiation phase for a certain protocol mode; detecting a presence of the certain protocol mode depending on the information from the IC card; and allocating the at least one set of the plurality of electrical contacts of the IC card to support an operation in at least one mode depending on the detected presence of the certain protocol mode.

DETAILED DESCRIPTION OF THE INVENTION

As an overview, it is desirable to have the IC card enabling simultaneously supporting a high speed and contactless protocol modes without multiplexing signals nor reusing ISO protocol or high speed protocol for contactless applications.

Figure 1:
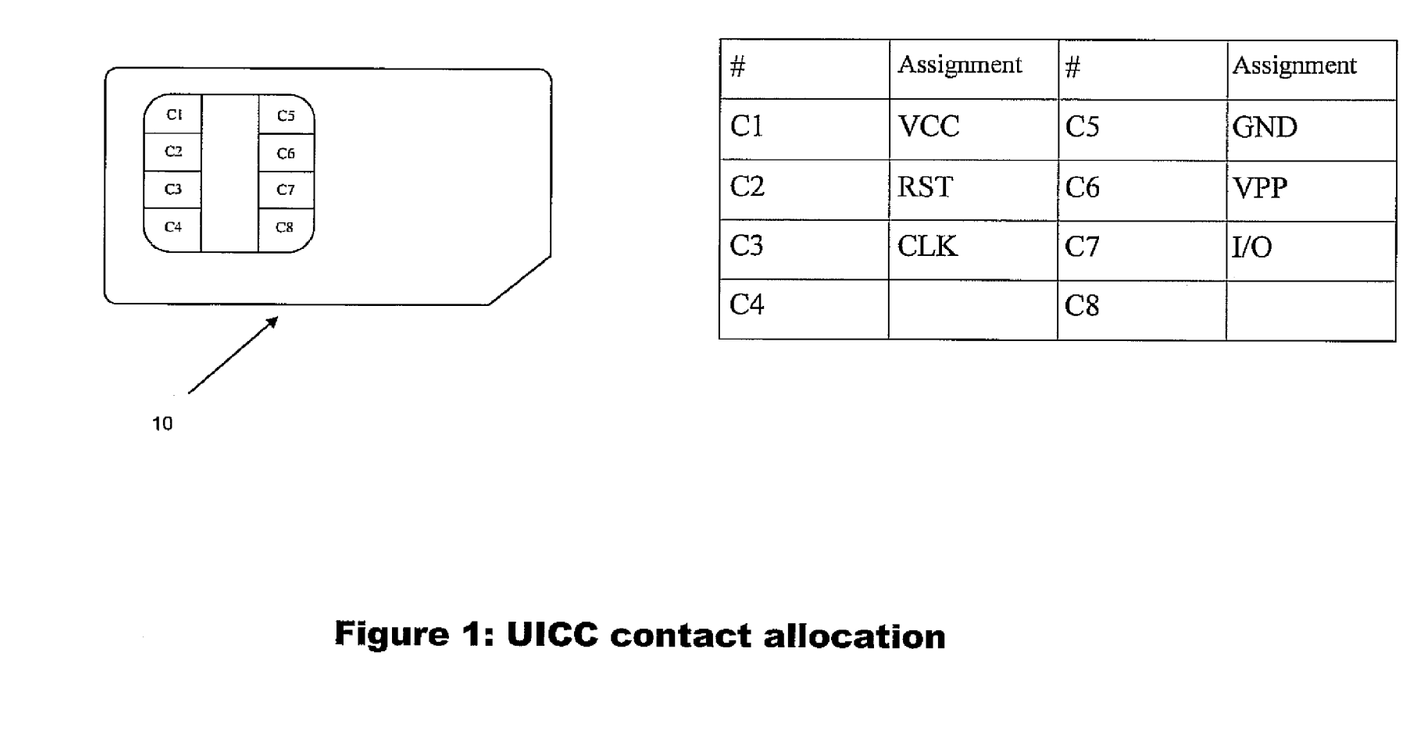
FIG. 1 is an explanatory view showing a UICC and a table of electrical contacts of the UICC according to the present invention.

As illustrated in FIG. 1, the integrated circuit (IC) card 10 may have eight electrical contacts. They are referred to as C1 though C8, as shown in FIG. 1. Here, not all eight electrical contacts may not be electrically engaged with a processor and some of them are unused. These non-used contacts can either be allocated to a specific technology depending on the presence of a specific protocol. This allocation of the electrical contacts of the IC card can be the principle of this invention.

As shown in FIG. 1, five of the electrical contacts may be allocated to a historical ISO protocol (ISO 7816) and three (C4, C6 and C8 available) unused electrical contacts can be available for further developments, such as a high speed protocol and contactless protocol.

The definition of each contact of the UICC can be explained as follows:

I/O: Input or Output for serial data to the integrated circuit inside the card.

VPP: Programming voltage input (defined but not used).

GNU: Ground (reference voltage),

CLK: Clocking or timing signal.

RST: Either used itself (reset signal supplied from the interface device) or in combination with an internal reset control circuit (optional use by the card). If the internal reset is implemented, the voltage supply on Vcc is mandatory.

VCC: Power supply input.

ETSI SCP TS 102 221 (UICC characteristics) defines a generic platform for an IC card application and specifies the interface between the UICC or IC card and a mobile communications terminal for wireless telecommunications network operations (e.g., 2G 3G, etc.). The additional details of the UICC, standards based on ETSI SCP TS102 221 (2005-06) or the like are taken into consideration.

In accordance with an embodiment of the present invention, the UICC comprises a plurality of electrical contacts, and a memory to store information, the memory being allowed to communicate with a processor via the contacts, wherein at least one set of electrical contacts are allowed to be allocated by the processor to support an operation in the ISO 7816 protocol mode or non-ISO mode depending on a presence of a high speed protocol or contactless protocol detected by a processor. The scope of the present invention is not intended to be limited to any particular elements such as the memory or processor as described above. Moreover, the scope of the present invention may not be limited to any specific kind of IC card or smart card, and other various IC cards or smart cards can be considered to include the essential features of the present invention described in this.

Some of various applications of the contactless protocol of the UICC can include a public transport payment card, a smart pay card (similar to pay as a user goes), a mobile communications terminal with the smart pay scheme, and the like.

The UICC can be compatible with at least one of a Subscriber Identity Module (SIM) function, a Universal Subscriber Identity Module (USIM) function, and IP based MultiMedia Subsystem SIM (ISIM or IMS SIM) function. However, it is clear that other types of SIM card or similar operations may also be supported by the features of the present invention.

A method according to a first embodiment of the present invention will be described while referring to FIG. 2.

Figure 2:
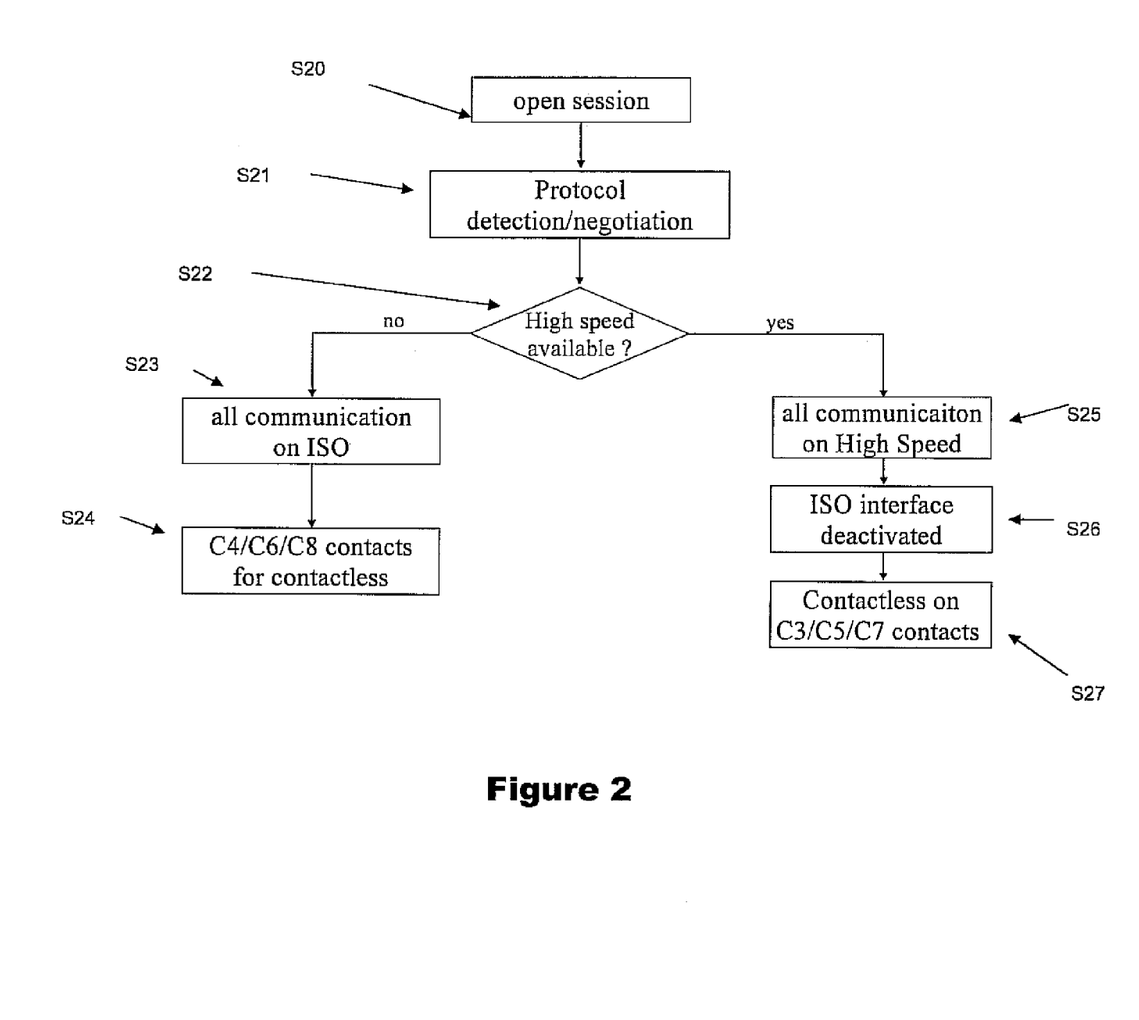
FIG. 2 is a flowchart of a first embodiment of a method of operating the UICC of FIG. 1.

As shown in FIG. 2, in the method for dynamically allocating at least one set of a plurality of electrical contacts of an integrated circuit (IC) card, the method begins when an external device such as the mobile communications terminal gets a set of information from the UICC at the session opening (S20). The first batch of information comes out of the session opening is an Answer To Reset (ATR, defined in ISO 7816 specification). ATR is an elementary file which indicates operation characteristics of the card. This currently includes the different flavors of T=0 protocol. This protocol type defines the structure and processing of commands initiated by an interface device for transmission control and for card specific control in an asynchronous half duplex character transmission protocol. This protocol uses the parameters indicated by the ATR, unless modified by the protocol type selection.

The method then initiates a protocol detection/negotiation after the open session (S21). After the step of protocol detection/negotiation, the method is detecting the high speed protocol (S22). There can be at least three modes of detecting information regarding the presence of the high speed protocol mode, For this step, the first mode of detecting may comprise detecting information regarding the high speed protocol mode included in the Answer To Reset (ATR), which is stored in the UICC, in accordance with International Standard Organization (ISO) 7816 protocol at power on of the mobile terminal.

The second mode of detecting a presence of the certain protocol mode can further comprise detecting a list of enabled protocol modes in a Service Table, which is stored in the UICC, in accordance with ETSI SCP TS 102 221 in the UICC, the list comprising information regarding the high speed protocol mode at power on of the mobile terminal.

The last mode of detecting a presence of the certain protocol mode can comprise detecting a presence of a physical interface based on the high speed protocol mode within the mobile communications terminal and configuring the UICC for the operation in the high speed protocol mode depending on the detecting. This last mode of determination is to try to access the physical interface and to identify the interface when getting a correct status back. If the operation is successful, the interface is identified and can be used. In the other case, the terminal concludes that ISO protocol is the only relevant interface.

Figure 3:
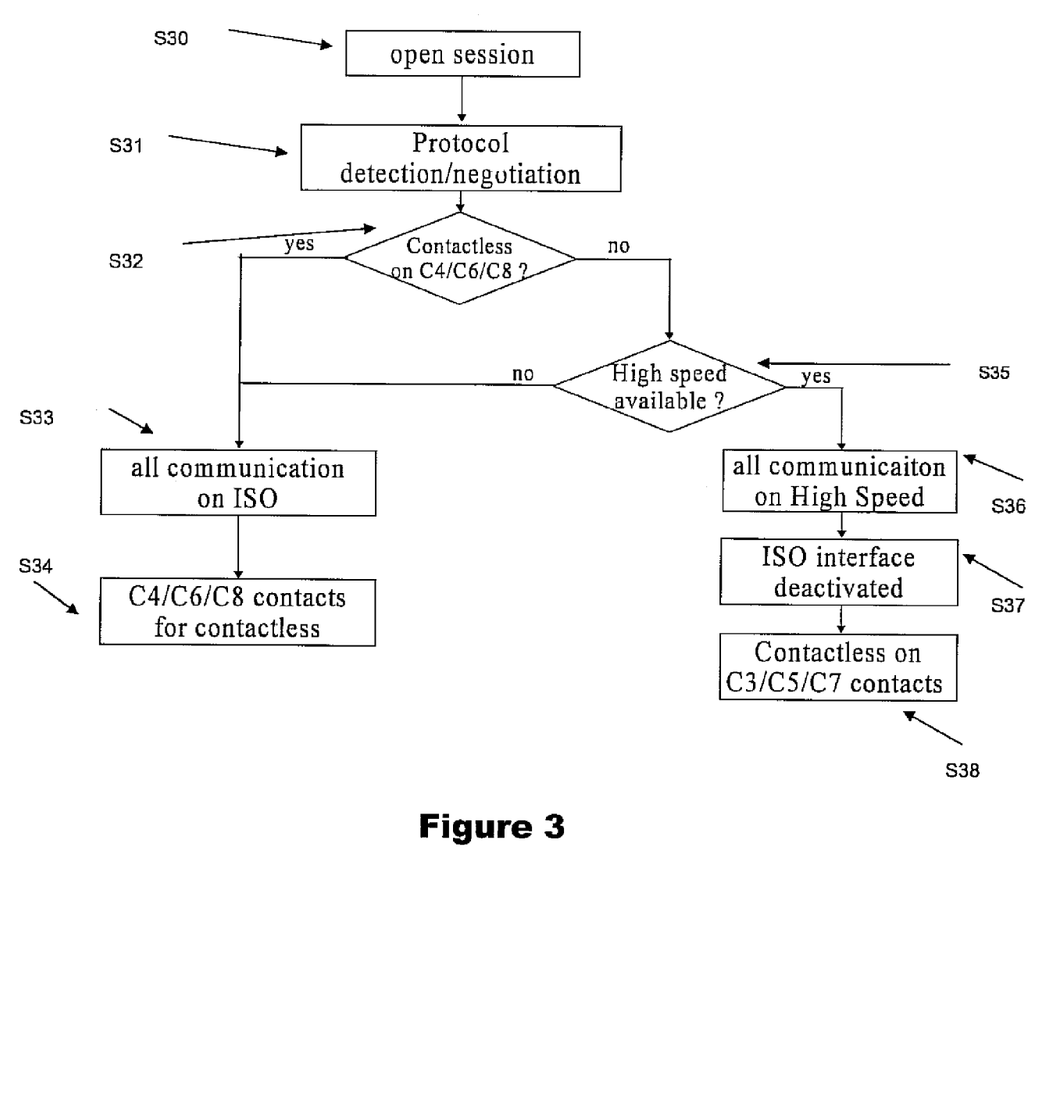
FIG. 3 is a flowchart of a second embodiment of a method of operating the UICC of FIG. 1.

These three modes to detect the available high speed protocol are shown in the FIGS. 2 and 3 in the step of Protocol detection/negotiation (S22 and S35, respectively). In accordance with the present invention, a user can choose a mode of detecting the high speed protocol among the three modes described above. The selection can be made automatically or based on some priority. The scope of the present invention is not intended to be limited to the three modes to detect the available high speed protocol described herein.

If no high speed protocol is detected, then the method can maintain the traditional ISO 7816 electrical contacts for all communications and the terminal may conclude that the ISO 7816 is the only relevant protocol (S23). If the UICC can further support the contactless protocol, the contactless protocol can be implemented on the three available non-used electrical contacts, expressly C4/C6/C8 contacts of the UICC (S24). The contacts C4/C6/C8 have been referred to merely for the sake of explanation of the present invention and the contacts other than C4/C6/C8 can be used as it would be understood by those skilled in the art.

When the high speed protocol is present and used, the method may manage the all communications in the high speed protocol mode (S25) and the historical ISO 7816 protocol is not used anymore (S26). Accordingly, the electrical contacts originally allocated for the ISO 7816 protocol may become available for other uses. When the high speed protocol is enabled and used, there is no interest to maintain the ISO protocol because it is less efficient and the high speed protocol can easily fulfill the tasks that ISO was dealing with. However, the terminal may still open a session in the ISO 7816 protocol mode for backward compatibility issue.

At this stage, the electrical contacts originally allocated for the ISO protocol can be available. For example, three previously allocated contacts among the now available electrical contacts can be used to operate the UICC in the new protocol mode: C3/C5/C7. The contacts C3/C5/C7 have been referred to merely for the sake of explanation of the present invention and the contacts other than C3/C5/C7 can be used as it would be understood by those skilled in the art.

If the UICC can further support the contactless protocol, the contactless protocol can be implemented on one, two or three of these contacts (e.g., C3/C5/C7) (S27). It is noted that depending on the contactless implementation, there could be one or two remaining contacts useable for other future interfaces.

FIG. 3 shows a flowchart of a second embodiment of a method of operating the UICC.

The method begins when the external device such as the mobile communications terminal gets a set of information from the UICC at the session opening (S30). The first method of allocating the electrical contacts of the UICC as show in FIG. 2 may detect the presence of the high speed protocol within the UICC before allocating the electrical contacts for the specific service such as the contactless protocol. However, the second embodiment of the method of operating the UICC in accordance with the present invention may be intended to detect the contactless protocol, which is already enabled on the electrical contacts of the UICC, before detecting the high speed protocol. Namely, the UICC includes the contactless protocol enabled on the C4/C6/C8 contacts. Here, the contacts C4/C6/C8 have been referred to merely for the sake of explanation of the second embodiment of the method of operating the UICC for the present invention. Accordingly, the contactless protocol can be implemented on one, two or three of these contacts and the contacts other than C4/C6/C8 can be used as it would be understood by those skilled in the art.

The method then initiates a protocol detection/negotiation after the open session (S31). After the step of protocol detection/negotiation, the method is detecting whether there is a contactless protocol present (S32). There can be at least two modes of detecting information regarding the presence of the contactless protocol mode enabled on the C4/C6/C8 contacts.

The first mode of detecting may comprise detecting information regarding the contactless protocol mode included in the Answer To Reset (ATR), which is stored in the UICC, in accordance with the International Standard Organization (ISO) 7816 protocol at power on of the mobile terminal.

The second mode of detecting a presence of the contactless protocol mode can further comprise detecting a list of enabled protocol modes in the Service Table, which is stored in the IC card, in accordance with the ETSI SCP TS 102 221 in the UICC at power on of the mobile terminal.

If it is detected that the contactless protocol is enabled on the C4/C6/C8 electrical contacts, then the method can maintain the traditional ISO 7816 electrical contacts for all communications and the terminal may conclude that the ISO 7816 is the only relevant protocol (S33). Then the contactless protocol supported by the ISO 7816 protocol is enabled on the three available non-used electrical contacts, expressly C4/C6/C8 contacts of the UICC (S34).

If the contactless protocol enabled on the C4/C6/C8 contacts is not detected, then the method proceeds to detect the presence of the high speed protocol within the UICC (S32). Because the steps S35-38 shown in FIG. 3 for detecting the presence of the high speed protocol and allocating the electrical contacts of the UICC for the contactless protocol with the high speed protocol can be substantially identical to the steps of S25-S27 of the first embodiment of the method of operating the UICC as shown in FIG. 2, the detailed explanation of steps S35-38 may not be repeated.

Similarly as a previously described steps in FIG. 2, when the presence of the high speed protocol is not detected at the step S35, the ISO 7816 protocol may be maintained and the contactless protocol supported by the ISO 7816 protocol is enabled on the three available non-used electrical contacts, expressly C4/C6/C8 contacts of the UICC (S33-S34). The detailed explanation of steps S35-S33-S34 can be referred to the previously described steps S22-S23-S24 in FIG. 2 because the steps S35-S33-S34 can be significantly similar to the steps S32-S33-S34 in FIG. 3. Accordingly, the detailed explanation of steps S35-S33-S34 may not be repeated.

Figure 4:
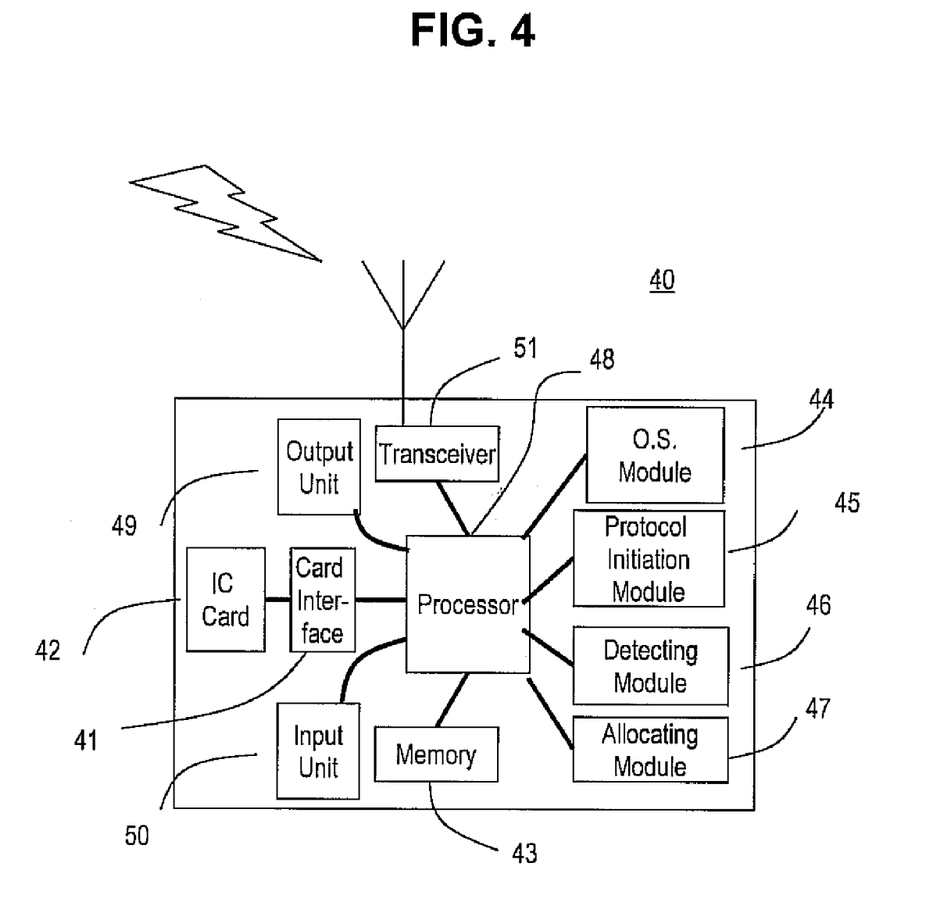
FIG. 4 is an explanatory diagram of the mobile communications terminal including the UICC according to the present invention.

FIG. 4 shows a block diagram of a mobile communications terminal 40 comprising: a physical card interface 41 allowed to be engaged with an IC card or UICC 42, a memory 43 to store information, an open session module 44 accessing the IC card 42 and retrieving information therefrom at an open session of the terminal 40, a protocol initiation module 45 initiating a negotiation phase for a certain protocol mode within the IC card 42, a detecting module 46 detecting a presence of the certain protocol mode for the IC card 42, an allocating module 47 allocating at least one set of the plurality of electrical contacts of the IC card 42 for a specific service, an output unit 49, an input unit 50, and a processor 48. These modules can be part of the processor although FIG. 4 shows them to be separate entities. The processor 48 controls the essential operation of the UICC 42 and the mobile terminal 40. The processor 48 is connected to a wireless network via a transceiver 51. The mobile communications terminal 40 may not be limited to comprise the elements described above, but also include many other limitations known in the art which are not shown or described in this, The processor 48 is located in a mobile communications terminal to implement procedures that are compatible with at least one of a Subscriber Identity Module (SIM) function, a Universal Subscriber Identity Module (USIM) function, and IP based MultiMedia Subsystem SIM (ISIM or IMS SIM) function. The processor 48 can cooperate with the card interface 41, the memory 43, the open session module 44, the protocol initiation module 45, the detecting module 46 and the allocating module 47 to detect a presence of the certain protocol mode depending on the information from the IC card 42, and allocate at least one set of the plurality of electrical contacts of the IC card 42 to support an operation in at least one mode Depending on the detected presence of the certain protocol mode.

The scope of the present invention may include a plurality of wireless networks including WI-FI, WLAN, WIBRO, WIMAX, BREW, 3G networks and the like because certain concepts and features thereof are common to those of the present invention, and thus allow implementation in various types of communications schemes. As related to UICC, this invention is related to the telecommunications area, but the solution may also cover the possible use of UICC out of this area. The scope of the invention may be related to any specific kind of a mobile terminal or device, including a PDA, a notebook computer, Ultra Portable Mobile Computer (UMPC), and so forth.

In accordance with the present invention, a mobile communications terminal comprises an IC card comprising: a plurality of electrical contacts; and a memory to store information, a physical interface allowed to be engaged with the IC card; and a processor cooperating with the IC card and the interface to perform receiving information from the IC card at an open session; initiating a negotiation phase for a certain protocol mode; detecting a presence of the certain protocol mode depending on the information from the IC card; and allocating the at least one set of the plurality of electrical contacts of the IC card to support an operation in at least one mode depending on the detected presence of the certain protocol mode.

As related to UICC, this invention is related to the telecommunication area, however, the solution may also cover the possible other uses of UICC out of this area. The present invention does not preclude feature implementation and supports various modes including the UICC supporting both contactless and high speed protocols, contactless only (not with the high speed protocol) and the high speed protocol only (not with the contactless protocol).

In accordance with the present invention, an integrated circuit (IC) card configured to communicate with a mobile terminal having a processor, comprises: a plurality of electrical contacts; and a memory to store information, the memory being allowed to communicate with the processor via the plurality of electrical contacts, wherein the electrical contacts are allowed to be allocated by the processor to support an operation in at least one mode depending on a presence of a certain protocol mode detected by the processor, wherein a first set of the electrical contacts is allocated in accordance with an International Standard Organization (ISO) 7816 protocol, and wherein a second set of the electrical contacts that is not allocated in accordance with the ISO 7816 protocol is allocated for at least one of a high speed protocol mode, contactless protocol mode, and a combination of a high speed and contactless protocol modes. At least one electrical contact of the first set is disabled when the high speed protocol mode is present and used, wherein the certain protocol mode is an International Standard Organization (ISO) 7816 mode supporting a contactless protocol mode enabled on at least three electrical contacts if a high speed protocol mode is not present. The IC card is configured to be compatible with at least one of a Subscriber Identity Module (SIM) function, a Universal Subscriber Identity Module (USIM) function, and IP based MultiMedia Subsystem SIM (ISIM or IMS SIM) function. Further, the processor is located in the mobile terminal to implement procedures that are compatible with at least one of a Subscriber Identity Module (SIM) function, a Universal Subscriber Identity Module (USIM) function, and IP based MultiMedia Subsystem SIM (ISIM or IMS SIM) function, wherein the processor is located in the mobile terminal to implement procedures that are compatible with a contactless payment scheme.

The present invention provides a method for dynamically allocating at least one set of a plurality of electrical contacts of a Subscriber Identity Module (SIM) device configured to communicate with a mobile terminal having a processor, the method comprising: receiving information from the SIM device at an open session; initiating a negotiation phase for a certain protocol mode; detecting a presence of the certain protocol mode depending on the information from the SIM device; and allocating the electrical contacts to support an operation in at least one mode depending on the detected presence of the certain protocol mode, wherein a first set of the electrical contacts is allocated in accordance with an International Standard Organization (ISO) 7816 protocol and a second set of the electrical contacts that is not allocated in accordance with the ISO 7816 protocol is allocated for at least one of a high speed protocol mode, contactless protocol mode, and a combination of a high speed and contactless protocol modes. The detecting a presence of the certain protocol further comprises detecting information regarding at least one of the high speed protocol mode and the contactless protocol mode included in an Answer To Reset (ATR), which is stored in the SIM device, in accordance with the International Standard Organization (ISO) 7816 protocol at power on of the mobile terminal, and wherein the plurality of electrical contacts comprises eight electrical contacts including C1, C2, C3, C4, C5, C6, C7, and C8 contacts in accordance with the International Standard Organization (ISO) 7816 protocol, wherein the detecting a presence of the certain protocol mode further comprises detecting a list of enabled protocol modes in a Service Table, which is stored in the SIM device, in accordance with ETSI SCP TS 102 221, the list comprising information regarding the high speed protocol mode at power on of the mobile terminal. The detecting a presence of the certain protocol mode further comprises detecting a presence of a physical interface with the high speed protocol mode within the mobile terminal and configuring the SIM device for the operation in the high speed protocol mode depending on the detecting. The method further comprises detecting whether the contactless protocol mode is enabled on the C4/C6/C8 electrical contacts of the SIM device; and maintaining the ISO 7816 protocol mode and allocating the C4/C6/C8 electrical contacts for the contactless protocol mode if the contactless protocol mode is enabled on the C4/C6/C8 electrical contacts, detecting whether the contactless protocol mode is enabled on the C4/C6/C8 electrical contacts of the SIM device; determining whether the high speed protocol mode is detected if the contactless protocol mode is not enabled on the C4/C6/C8 electrical contacts; and using the high speed protocol mode by disabling the ISO 7816 protocol mode and allocating at least one of the C3/C5/C7 electrical contacts for the contactless protocol mode if the high speed protocol mode is detected. The detecting a presence of the certain protocol mode further comprises detecting a list of enabled protocol modes in a Service Table, which is stored in the SIM device, in accordance with ETSI SCP TS 102 221, the list comprising information regarding the contactless protocol mode at power on of the mobile terminal, and wherein the plurality of electrical contacts comprises eight electrical contacts including C1, C2, C3, C4, C5, C6, C7, and C8 contacts in accordance with the International Standard Organization (ISO) 7816 protocol. Further, the method comprises: detecting whether the contactless protocol mode is enabled on the C4/C6/C8 electrical contacts of the SIM device; maintaining the ISO 7816 protocol mode and allocating the C4/C6/C8 electrical contacts for the contactless protocol mode if the contactless protocol mode is enabled on the C4/C6/C8 electrical contacts; detecting whether the contactless protocol mode is enabled on the C4/C6/C8 electrical contacts of the SIM device; determining whether the high speed protocol mode is detected if the contactless protocol mode is not enabled on the C4/C6/C8 electrical contacts; and using the high speed protocol mode by disabling the ISO 7816 protocol mode and allocating at least one of the C3/C5/C7 electrical contacts of the SIM device for the contactless protocol mode if the high speed protocol mode is detected, wherein the physical interface with the high speed protocol mode is compatible with at least one of the group comprising a MultiMediaCard (MMC) and a Universal Serial Bus (USB).

The present invention provides a mobile communications terminal comprising: a physical interface allowed to be engaged with an integrated circuit (IC) card; a memory to store information; an open session module accessing the IC card and retrieving information therefrom at an open session of the terminal; a protocol initiation module initiating a negotiation phase for a certain protocol mode within the IC card; a detecting module detecting a presence of the certain protocol mode for the IC card; an allocating module allocating at least one set of the plurality of electrical contacts of the IC card; and a processor cooperating with the physical interface, the memory, the open session module, the protocol initiation module, the detecting module and the allocating module such that a presence of the certain protocol mode is detected depending on the information from the IC card; and at least one set of the plurality of electrical contacts of the IC card is allocated to support an operation in at least one mode depending on the detected presence of the certain protocol mode, wherein the certain protocol mode comprises at least one of a high speed protocol mode and a contactless protocol mode, and processor implements procedures that are compatible with at least one of the group comprising a Subscriber Identity Module (SIM) function, a Universal Subscriber Identity Module (USIM) function, and IP based MultiMedia Subsystem SIM (ISIM or IMS SIM) function, wherein at least one set of electrical contacts are allocated in accordance with International Standard Organization (ISO) 7816 protocol, and wherein the electrical contacts that are not allocated in accordance with the ISO 7816 protocol are allocated for at least one of a high speed protocol mode, contactless protocol mode, and a combination of a high speed and contactless protocol modes, wherein the at least one set of electrical contacts allocated for the ISO 7816 protocol is disabled when the high speed protocol mode is present and used, and wherein the at least one set of electrical contacts allocated for the ISO 7816 protocol is reallocated for the contactless protocol mode, wherein the open session module, the protocol initiation module, the detecting module and the allocating module are part of the processor, and wherein the open session module, the protocol initiation module, the detecting module and the allocating module are separate entities and not part of the processor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An integrated circuit (IC) card configured to communicate with a mobile terminal having a processor, the IC card comprising:
   a plurality of electrical contacts; and
   a memory to store information, wherein the memory is in communication with the processor via the plurality of electrical contacts,
   wherein the processor allocates the plurality of electrical contacts to concurrently support operation in at least a contactless protocol mode and another mode depending on a presence of a certain protocol mode detected by the processor,
   wherein a first set of the plurality of electrical contacts is allocated to support an International Standard Organization (ISO) 7816 protocol in response to an absence of a high speed protocol mode and wherein the first set of the plurality of electrical contacts is allocated to support the another mode in response to a presence of the high speed protocol mode, and
   wherein a second set of the plurality of electrical contacts not allocated to support the ISO 7816 protocol is allocated to support at least the high speed protocol mode, the contactless protocol mode, or a combination of the high speed and contactless protocol modes.

2. The IC card of claim 1, wherein at least one electrical contact of the first set is disabled when the high speed protocol mode is present and used.

3. The IC card of claim 1, wherein the certain protocol mode is the International Standard Organization (ISO) 7816 mode supporting the contactless protocol mode enabled on at least three of the plurality of electrical contacts when the high speed protocol mode is not present.

4. The IC card of claim 1, further configured to be compatible with at least a Subscriber Identity Module (SIM) function, a Universal Subscriber Identity Module (USIM) function, or an IP based MultiMedia Subsystem SIM (ISIM or IMS SIM) function.

5. The IC card of claim 1, wherein the processor is located in the mobile terminal to implement procedures that are compatible with at least a Subscriber Identity Module (SIM) function, a Universal Subscriber Identity Module (USIM) function, or an IP based MultiMedia Subsystem SIM (ISIM or IMS SIM) function.

6. The IC card of claim 1, wherein the processor is located in the mobile terminal to implement procedures that are compatible with a contactless payment scheme.

7. A method for dynamically allocating at least one set of a plurality of electrical contacts of a Subscriber Identity Module (SIM) device configured to communicate with a mobile terminal having a processor, the method comprising:
   receiving information from the SIM device at an open session;
   initiating a negotiation phase for a certain protocol mode;
   detecting a presence of the certain protocol mode according to the information from the SIM device; and
   allocating the plurality of electrical contacts to concurrently support operation in at least a contactless protocol mode and another mode depending on the detected presence of the certain protocol mode,
   wherein a first set of the plurality of electrical contacts is allocated to support an International Standard Organization (ISO) 7816 protocol in response to an absence of a high speed protocol mode and wherein the first set of the plurality of electrical contacts is allocated to support the another mode in response to a presence of the high speed protocol mode, and wherein a second set of the plurality of electrical contacts not allocated to support the ISO 7816 protocol is allocated to support at least the high speed protocol mode, the contactless protocol mode, or a combination of the high speed and contactless protocol modes.

8. The method of claim 7, wherein detecting the presence of the certain protocol comprises detecting information regarding at least the high speed protocol mode or the contactless protocol mode included in an Answer To Reset (ATR), which is stored in the SIM device, in accordance with the International Standard Organization (ISO) 7816 protocol at power-on of the mobile terminal, and wherein the plurality of electrical contacts comprises eight electrical contacts including C1, C2, C3, C4, C5, C6, C7, and C8 electrical contacts in accordance with the International Standard Organization (ISO) 7816 protocol.

9. The method of claim 7, wherein detecting the presence of the certain protocol mode further comprises detecting a list of enabled protocol modes in a Service Table, which is stored in the SIM device, in accordance with ETSI SCP TS 102 221, the list comprising information regarding the high speed protocol mode at power-on of the mobile terminal.

10. The method of claim 7, wherein detecting the presence of the certain protocol mode further comprises detecting a presence of a physical interface with the high speed protocol mode within the mobile terminal and configuring the SIM device for the operation in the high speed protocol mode depending on the detection.

11. The method of claim 8, further comprising:
detecting whether the contactless protocol mode is enabled on the C4, C6, and C8 electrical contacts of the SIM device; and
maintaining the ISO 7816 protocol mode and allocating the C4, C6, and C8 electrical contacts for the contactless protocol mode if the contactless protocol mode is enabled on the C4, C6, and C8 electrical contacts.

12. The method of claim 8, further comprising:
detecting whether the contactless protocol mode is enabled on the C4, C6, and C8 electrical contacts of the SIM device;
determining whether the high speed protocol mode is detected if the contactless protocol mode is not enabled on the C4, C6, and C8 electrical contacts; and
using the high speed protocol mode by disabling the ISO 7816 protocol mode and allocating at least the C3, C5, or C7 electrical contacts for the contactless protocol mode if the high speed protocol mode is detected.

13. The method of claim 7, wherein detecting the presence of the certain protocol mode further comprises detecting a list of enabled protocol modes in a Service Table, which is stored in the SIM device, in accordance with ETSI SCP TS 102 221, the list comprising information regarding the contactless protocol mode at power-on of the mobile terminal, and wherein the plurality of electrical contacts comprises eight electrical contacts including C1, C2, C3, C4, C5, C6, C7, and C8 electrical contacts in accordance with the International Standard Organization (ISO) 7816 protocol.

14. The method of claim 13, further comprising:
detecting whether the contactless protocol mode is enabled on the C4, C6, and C8 electrical contacts of the SIM device; and
maintaining the ISO 7816 protocol mode and allocating the C4, C6, and C8 electrical contacts for the contactless protocol mode if the contactless protocol mode is enabled on the C4, C6, and C8 electrical contacts.

15. The method of claim 13, further comprising:
detecting whether the contactless protocol mode is enabled on the C4, C6, and C8 electrical contacts of the SIM device;
determining whether the high speed protocol mode is detected if the contactless protocol mode is not enabled on the C4, C6, and C8 electrical contacts; and
using the high speed protocol mode by disabling the ISO 7816 protocol mode and allocating at least the C3, C5, or C7 electrical contacts of the SIM device for the contactless protocol mode if the high speed protocol mode is detected.

16. The method of claim 10, wherein the physical interface with the high speed protocol mode is compatible with at least a MultiMediaCard (MMC) or a Universal Serial Bus (USB).

17. A mobile communications terminal comprising:
a physical interface coupled to an integrated circuit (IC) card;
a memory to store information;
an open session module accessing the IC card and retrieving information from the IC card at an open session of the terminal;
a protocol initiation module initiating a negotiation phase for a certain protocol mode within the IC card;
a detecting module detecting a presence of the certain protocol mode for the IC card;
an allocating module allocating at least one set of the plurality of electrical contacts of the IC card; and
a processor cooperating with the physical interface, the memory, the open session module, the protocol initiation module, the detecting module and the allocating module to detect the presence of the certain protocol mode according to the information from the IC card,
wherein the at least one set of the plurality of electrical contacts of the IC card is allocated to concurrently support operation in at least a contactless protocol mode and another mode depending on the detected presence of the certain protocol mode,
wherein a first set of the plurality of electrical contacts is allocated to support an International Standard Organization (ISO) 7816 protocol in response to an absence of a high speed protocol mode and wherein the first set of the plurality of electrical contacts is allocated to support the another mode in response to a presence of the high speed protocol mode, and
wherein a second set of the plurality of electrical contacts not allocated to support the ISO 7816 protocol is allocated to support at least the high speed protocol mode, the contactless protocol mode, or a combination of the high speed and contactless protocol modes.

18. The terminal of claim 17, wherein the certain protocol mode comprises at least the high speed protocol mode or the contactless protocol mode, and wherein the processor implements procedures that are compatible with at least a Subscriber Identity Module (SIM) function, a Universal Subscriber Identity Module (USIM) function, or an IP based MultiMedia Subsystem SIM (ISIM or IMS SIM) function.

19. The terminal of claim 17, wherein the at least one set of electrical contacts allocated to support the ISO 7816 protocol is disabled when the high speed protocol mode is present and used, and wherein the at least one set of the plurality of electrical contacts allocated to support the ISO 7816 protocol is reallocated for the contactless protocol mode.

20. The terminal of claim 17, wherein the open session module, the protocol initiation module, the detecting module and the allocating module are part of the processor.

21. The terminal of claim 17, wherein the open session module, the protocol initiation module, the detecting module and the allocating module are separate entities and not part of the processor.

* * * * *